United States Patent [19]

Franco

[11] 4,275,918
[45] Jun. 30, 1981

[54] RESILIENT SUSPENSION FOR THE CAB OF AN AGRICULTURAL TRACTOR

[75] Inventor: Bartolo Franco, Casalgrasso, Italy

[73] Assignee: Centro Ricerche Fiat S.p.A., Orbassano, Italy

[21] Appl. No.: 54,764

[22] Filed: Jul. 5, 1979

[30] Foreign Application Priority Data

Aug. 11, 1978 [IT] Italy .............................. 68895 A/78

[51] Int. Cl.³ ............................................ B62D 33/06
[52] U.S. Cl. ................................ 296/190; 180/89.12; 180/900; 280/697; 267/31
[58] Field of Search ..................... 296/190; 180/89.12, 180/900; 280/697, 718; 105/456, 453; 267/8, 13, 14, 18, 24, 31, 36, 41

[56] References Cited

U.S. PATENT DOCUMENTS

| 1,934,892 | 11/1933 | Tea | 267/36 R X |
|---|---|---|---|
| 1,952,718 | 3/1934 | Lee | 267/36 R X |
| 3,041,086 | 6/1962 | Walker | 267/36 R X |
| 3,120,962 | 2/1964 | Long, Jr. | 267/31 X |
| 3,800,896 | 4/1974 | Albertson | 267/18 X |
| 3,882,957 | 5/1975 | Plegat | 180/89.14 |
| 3,944,017 | 3/1976 | Foster | 296/190 X |
| 4,065,153 | 12/1977 | Pringle | 267/31 X |
| 4,135,757 | 1/1979 | Smith et al. | 296/190 X |
| 4,193,629 | 3/1980 | Merkle | 296/190 |

FOREIGN PATENT DOCUMENTS

| 1555946 | 4/1978 | Fed. Rep. of Germany | 296/190 |
|---|---|---|---|
| 2708477 | 8/1978 | Fed. Rep. of Germany | 296/190 |
| 2726034 | 12/1978 | Fed. Rep. of Germany | 296/190 |
| 2730139 | 1/1979 | Fed. Rep. of Germany | 296/190 |
| 407923 | 9/1977 | Sweden | 296/190 |

*Primary Examiner*—John P. Silverstrim
*Assistant Examiner*—Norman L. Stack, Jr.
*Attorney, Agent, or Firm*—Sughrue, Rothwell, Mion, Zinn and Macpeak

[57] ABSTRACT

A tracked agricultural tractor in which the frame of the driver's cab is mounted on the tractor body by a suspension including a pair of transverse suspension structures, a pair of rigid transverse support structures and first and second shock absorber means, can be driven at speed over rough ground without a substantial adverse effect on the driver's comfort, since the rolling and pitching oscillations of the cab relative to the tractor body are damped by the shock absorbers, and their amplitudes limited by stop elements acting between the suspension and the cab frame.

1 Claim, 3 Drawing Figures

RESILIENT SUSPENSION FOR THE CAB OF AN AGRICULTURAL TRACTOR

DESCRIPTION

The present invention relates to resilient suspensions for the cabs of vehicles such as argicultural tractors.

More particularly, the invention is concerned with a resilient suspension for the cab of an agricultural tractor of the type having a body and a cab delimited by a rigid frame supported from the body by the suspension.

The object of the present invention is to provide a resilient suspension for the cab of a vehicle such as an agricultural tractor which ensures sufficient driver comfort, when the tractor is used on rough ground, to permit the forward speed of the tractor to be increased beyond that tolerated with previous cab suspensions. It is envisaged that the invention will have particular utility in tractors of the type having crawler tracks.

According to the present invention there is provided a resilient suspension for the cab of a vehicle of the aforesaid type, characterised in that the suspension includes respective front and rear transverse suspension structures, each of which comprises two struts formed by respective leaf springs upstanding from the vehicle body disposed substantially in longitudinal planes when relaxed, and interconnected by a cross member formed by a leaf spring lying when relaxed in a plane which is perpendicular to the planes of the two struts and parallel to the longitudinal axis of the vehicle, and shock absorber means to damp rolling and pitching oscillations of the cab, relative to the vehicle body, due to the flexural resilience of said suspension structures.

The use of the spring suspension structures at the front and rear of the cab in accordance with the invention gives a smooth ride even when the vehicle is operating on rough terrain.

One embodiment of the invention will now be more particularly described, by way of example, with reference to the accompanying drawings, in which.

Figure 1:
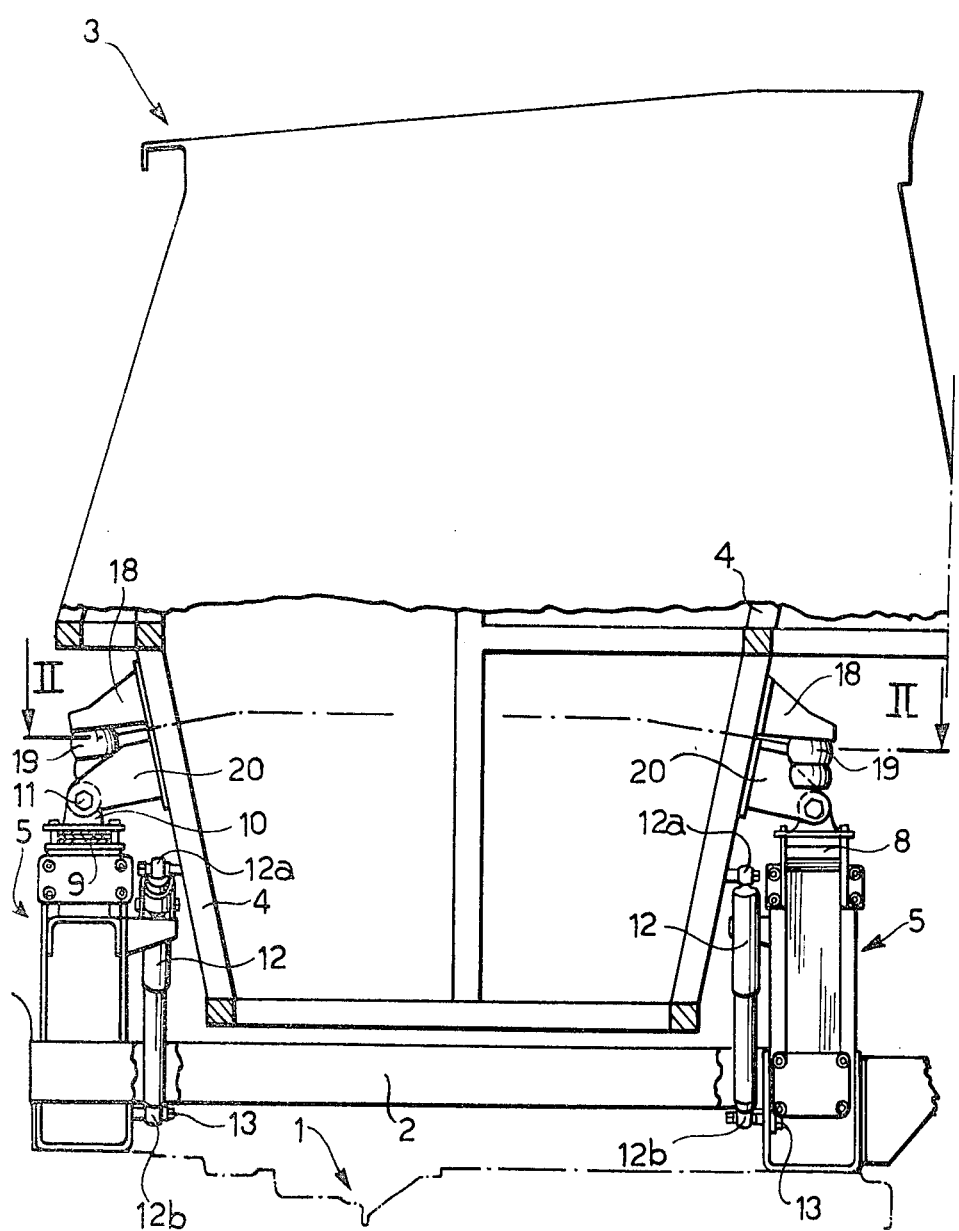
FIG. 1 is a longitudinal sectional view of an agricultural tractor provided with a resilient suspension according to the present invention, for the driver's cab.
Figure 2:
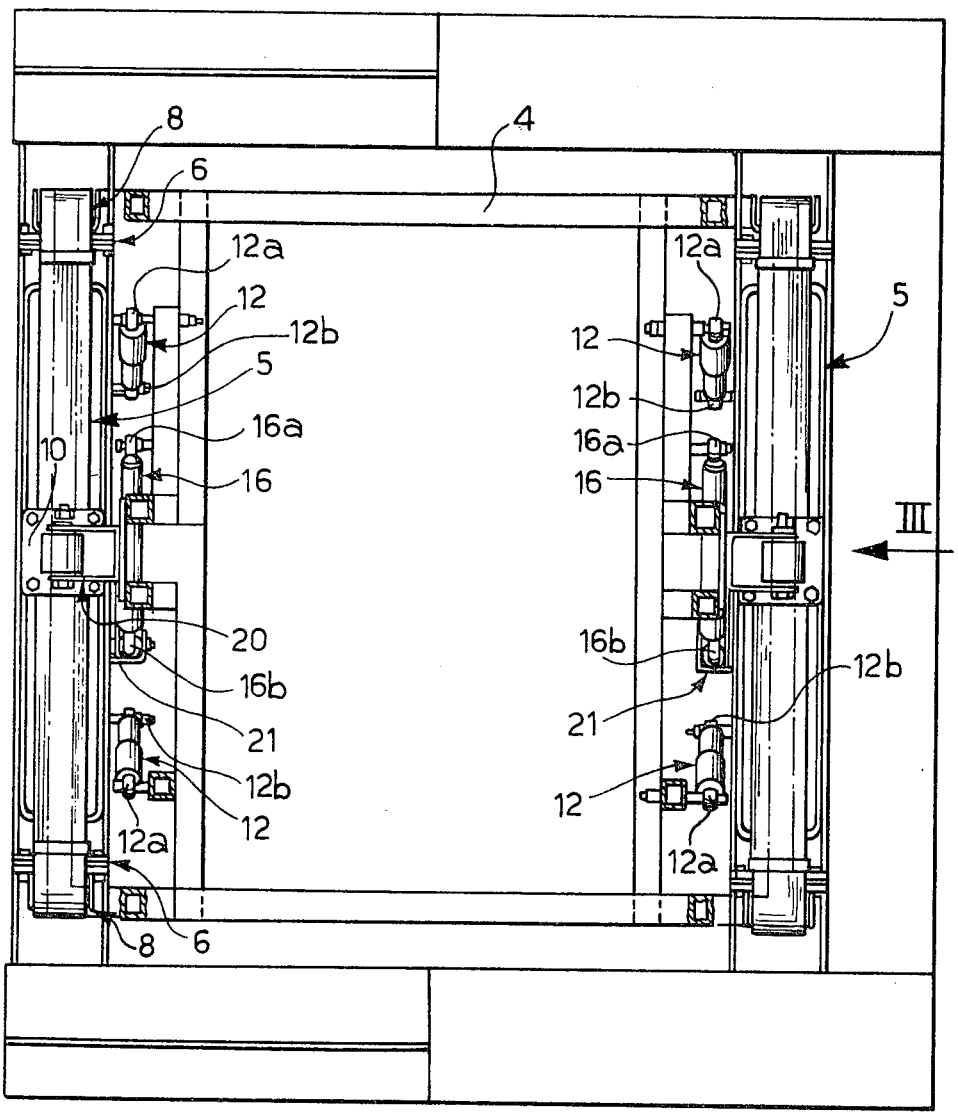
FIG. 2 is a section taken along the line II-II of FIG. 1.

Referring now to the drawings, there is shown, in broken outline, the upper part of the body 1 of a tracked agricultural tactor mounting a platform 2 which supports a driver's cab 3 delimited by a rigid frame 4. A resilient suspension is interposed between the platform 2 and the driver's cab 3 and will now be described in detail.

Figure 3:
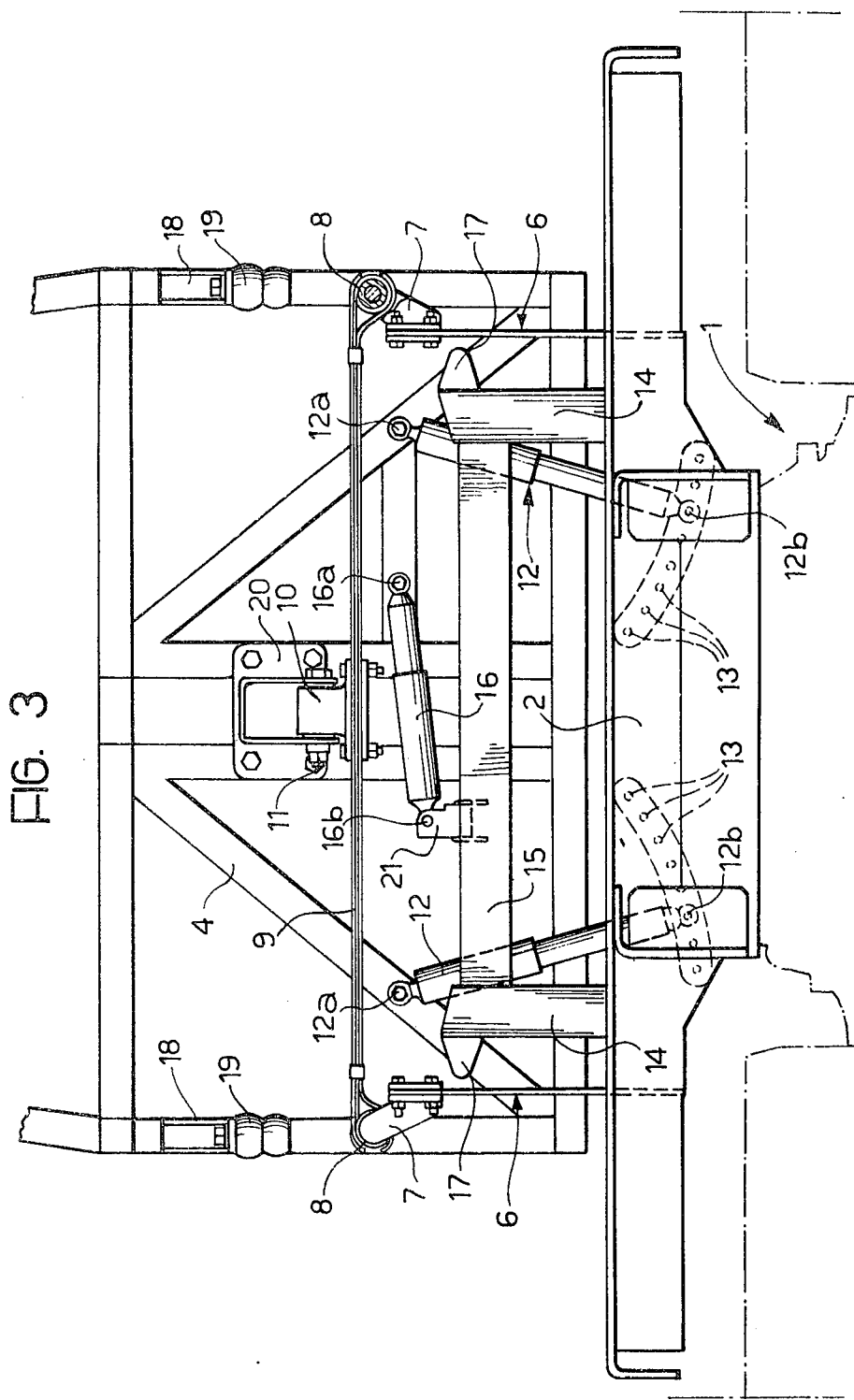
FIG. 3 is a view in the direction of arrow III in FIG. 2.

Mounted on the platform 2, to the front and rear of the driver's cab 3, are respective transverse, suspension structures 5, each comprising two upstanding struts 6 and a cross member 9. The struts 6 and the cross members 9 are formed by respective leaf springs which, when relaxed as shown in FIG. 3, lie in vertical longitudinal planes and horizontal planes, respectively. The terms 'vertical' and 'horizontal' are used herein to refer to orientations when the tractor is resting on a horizontal surface, as shown in the drawings.

The cross members 9 are articulated at each end to a respective bush 8 which is carrried by a support 7 at the upper end of each strut 6. Each cross member 9 is provided with a central bracket 10 supporting a respective pivot pin 11, the axis of which is perpendicular to the longitudinal plane of symmetry of the tractor. Respective forked supports 20 are fixed to the front and rear of the cab frame 4, each forked support 20 being articulated to a respective cross member 9 by a respective pivot pin 11.

A pair of first hydraulic, telescopic shock absorbers 12 are located adjacent each suspension structure 5, as shown in FIG. 3. The two shock absorbers 12 of each pair of inclined so that their longitudinal axes converge downwardly towards the longitudinal plane of symmetry of the tractor. Each shock absorber 12 is articulated at its upper end 12a to the cab frame 4, and at its lower end 12b to the tractor body at one of a plurality of articulation points defined by holes 13 which are arranged in an arc of a circle, the centre of which corresponds to the articulation point of the upper end 12a of the shock absorber 12. The inclination of the longitudinal axis of each shock absorber 12 can be varied relative to the longitudinal plane of symmetry of the tractor by articulating its lower end 12b at different respective holes 13.

A rigid transverse support structure, comprising two struts 14 and a cross member 15, is mounted at the front and rear of the platform 2 adjacent each resilient suspension structure 5. The rigid struts 14 and cross members 15 are formed by shaped metal sections which are rigidly interconnected at their ends. Each cross member 15 is provided with a respective support 20 which supports one end 16b of a respective second hydraulic telescopic shock absorber 16. Each shock absorber 16 is arranged with its axis slightly inclined to the horizontal and is articulated at its other end 16a to the cab frame 4. The second shock absorbers 16 are mounted at the front and rear of the cab 3 respectively.

An elastomeric stop 17 is fixed to the upper end of each rigid strut 14, and a bracket 18 with an elastomeric stop 19 is fitted to the cab frame 4 above each end of the cross members 9 of the suspension structures 5.

The resilient suspension described above provides a high degree of comfort for the driver, even when the tractor is driven over very rough ground. In fact, the leaf springs forming the cross members 9 enable the cab frame 4 to provide a resilient response to both rolling and pitching movements.

The struts 6 of the suspension structures 5, as well as supporting the whole of the cab 3 and conferring a degree of transverse resilience, also perform the function normally fulfilled by the suspension links of conventional leaf springs. The resilience of struts 6 enables considerable relative movement of the articulation bushes 8 of the cross-members 9 when the cross-members undergo a large degree of flexing.

The second shock absorbers 16 damp rolling the oscillations of the cab 3, and the first shock absorbers 12, in addition to damping the pitching oscillations, also damp the rolling oscillations, of the cab 3, thereby preventing excessive L-shaped deformation or buckling of the leaf-springs forming the cross members 9. The relative displacements between the cab frame 4 and the tractor body 1, particularly the amplitude of the rolling and pitching oscillations, are limited by the stop pads 17, 19.

It will be appreciated from the preceding description that, since the cab 3 is articulated to the tractor body 1, it is necessary to use flexible transmission means to connect the various controls in the cab 3 with their respective actuators in the tractor. Thus, for example, the hand brake and the accelerator are operated by flexible cables, while other controls may be operated hydraulically.

A driver's comfort may be further increased by providing a sprung seat, so that the suspension described above damp stresses of a small amplitude while the seat springs damp stresses of a greater amplitude.

What is claimed is:

1. In a vehicle such as an agricultural tractor having a body and a cab a resilient suspension which supports said cab from said body and which includes:
   (a) respective front and rear transverse suspension structures, each comprising:
      two struts formed by respective leaf springs upstanding from said vehicle body and disposed substantially in longitudinal planes when relaxed, and
      a cross-member interconnecting said struts and formed by a leaf spring lying, when relaxed, in a plane which is perpendicular to said planes of said struts and parallel to the longitudinal axis of said vehicle, and
   (b) shock absorber means to damp rolling and pitching oscillations of said cab relative to said vehicle body due to flexural resilience of said leaf springs of said suspension structures, wherein said shock absorber means include two pairs of first telescopic hydraulic shock absorbers, each pair being adjacent a respective said suspension structure, said shock absorbers of each pair being so inclined that their longitudinal axes converge downwardly towards said longitudinal plane of symmetry of the vehicle, each shock absorber being articulated at its upper end to said cab frame and at its lower end to said vehicle body and wherein said first shock absorbers are provided with respective means adjacent their said lower ends to enable said inclination of their respective longitudinal axes to be varied relative to each other.

* * * * *